United States Patent
Buice et al.

(10) Patent No.: US 11,597,343 B2
(45) Date of Patent: Mar. 7, 2023

(54) VEHICLE AIRBAG SYSTEM

(71) Applicant: Nissan North America, Inc., Franklin, TN (US)

(72) Inventors: Jessica Buice, Sterling Hts., MI (US); Jeffrey Clark, Windsor (CA); Daniel Hoisington, Novi, MI (US); Daniel Lin, Troy, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 779 days.

(21) Appl. No.: 16/351,080

(22) Filed: Mar. 12, 2019

(65) Prior Publication Data
US 2020/0290549 A1 Sep. 17, 2020

(51) Int. Cl.
| | |
|---|---|
| *B60R 21/214* | (2011.01) |
| *B60R 21/015* | (2006.01) |
| *B60R 21/0136* | (2006.01) |
| *B60R 21/26* | (2011.01) |
| *B60R 21/01* | (2006.01) |
| *B60R 21/16* | (2006.01) |

(52) U.S. Cl.
CPC ........ *B60R 21/214* (2013.01); *B60R 21/0136* (2013.01); *B60R 21/01554* (2014.10); *B60R 21/26* (2013.01); *B60R 2021/01286* (2013.01); *B60R 2021/161* (2013.01); *B60R 2021/26029* (2013.01)

(58) Field of Classification Search
CPC .................. B60R 21/214; B60R 2021/161
See application file for complete search history.

(56) References Cited

U.S. PATENT DOCUMENTS

| | | | |
|---|---|---|---|
| 8,910,971 B1 * | 12/2014 | Faruque | B60R 21/01 |
| | | | 280/728.2 |
| 9,283,911 B2 * | 3/2016 | Nagasawa | B60R 21/01538 |
| 9,789,840 B2 * | 10/2017 | Farooq | B60R 21/214 |
| 9,908,496 B2 * | 3/2018 | Choi | B60R 21/231 |
| 9,994,182 B1 | 6/2018 | Jaradi et al. | |
| 10,081,323 B2 | 9/2018 | Nagasawa et al. | |
| 10,160,417 B2 | 12/2018 | Malapati et al. | |
| 10,479,310 B2 * | 11/2019 | Dry | B60R 21/207 |
| 10,583,797 B2 * | 3/2020 | Line | B60N 2/42763 |
| 10,703,324 B2 * | 7/2020 | Hill | B60R 21/231 |
| 11,084,445 B2 * | 8/2021 | Faruque | B60R 21/045 |
| 11,142,157 B2 * | 10/2021 | Kim | B60N 2/01 |
| 2010/0127483 A1 * | 5/2010 | Seo | B60R 21/207 |
| | | | 280/730.2 |
| 2012/0080869 A1 | 4/2012 | Lee et al. | |
| 2019/0084517 A1 * | 3/2019 | Iyer | B60R 21/214 |

FOREIGN PATENT DOCUMENTS

| | | | | |
|---|---|---|---|---|
| JP | 2020117113 A | * | 8/2020 | |
| WO | WO-2018167919 A1 | * | 9/2018 | ............... B60N 2/14 |
| WO | WO-2020088917 A1 | * | 5/2020 | ............... B60N 2/06 |

* cited by examiner

*Primary Examiner* — Nicole T Verley
(74) *Attorney, Agent, or Firm* — Global IP Counselors, LLP

(57) ABSTRACT

A vehicle airbag system includes an airbag module, a seat detector, and an electronic controller. The airbag module has an airbag that is configured to be movably mounted to a vehicle roof structure. The seat detector detects a position of a vehicle seat. The electronic controller is in communication with the airbag module and the seat detector. The controller controls the airbag module to inflate the airbag in a predetermined direction based on detected position of the vehicle seat by the seat detector.

19 Claims, 8 Drawing Sheets

| IMPACT | SEAT ANGLE | | | |
|---|---|---|---|---|
| | 0° | 180° | 270° | 315° |
| FRONT | 0° | 180° | 270° | 315° |
| SIDE RH | *90° | *90° | 270° | *90° |
| SIDE LH | *270° | *270° | 270° | *270° |
| REAR | 0° | 180° | *180° | *225° |

FIG. 10

VEHICLE AIRBAG SYSTEM

BACKGROUND

Field of the Invention

The present invention generally relates to a vehicle airbag system. More specifically, the present invention relates to a vehicle airbag system configured to be mounted to a vehicle roof structure.

Background Information

A vehicle can include a variety of airbags as part of an occupant restraint system of the vehicle. The airbag is configured to absorb energy from an external impact and to control movement of one or more occupants inside of the vehicle. Vehicle airbags can be mounted in a variety of locations, such as inside a vehicle dashboard housing, from center consoles and or vehicle pillars. Additionally, airbags can be mounted to a vehicle roof structure to deploy from a position overhead of the vehicle seats. Further, airbags can be movable or rotatable to deploy at different positions depending on need or circumstances.

SUMMARY

In view of the state of the known technology, one aspect of the present disclosure is to provide a vehicle airbag system includes an airbag module, a seat detector, and an electronic controller. The airbag module has an airbag that is configured to be movably mounted to a vehicle roof structure. The seat detector detects a position of a vehicle seat. The electronic controller is in communication with the airbag module and the seat detector. The controller controls the airbag module to inflate the airbag in a predetermined direction based on detected position of the vehicle seat by the seat detector.

In view of the state of the known technology, another aspect of the present disclosure is to provide a vehicle having a vehicle airbag system. The vehicle airbag system comprises an airbag module, a vehicle seat, a seat detector and an electronic controller. The airbag module has an airbag movably mounted to a vehicle roof structure. The vehicle seat is disposed below the airbag module. The seat detector that detects a position of the vehicle seat. The electronic controller is in communication with the airbag module and the seat detector. The controller controls the airbag module to inflate the airbag in a predetermined direction based on detected position of the vehicle seat by the seat detector.

In view of the state of the known technology, another aspect of the present disclosure is to provide a vehicle having a vehicle airbag system. The vehicle airbag system comprises an airbag module, a vehicle seat, and an electronic controller. The airbag module has an airbag movably mounted to a vehicle roof structure. The vehicle seat is disposed below the airbag module. The electronic controller controls the airbag module to inflate the airbag in one of a default direction and a modified direction. The airbag is deployed into a default position that is substantially directly in front of the vehicle seat when deployed in the default direction. The airbag is deployed into a modified position that is offset from the default position when deployed in the modified direction.

BRIEF DESCRIPTION OF THE DRAWINGS

Referring now to the attached drawings which form a part of this original disclosure:

FIG. 10 is a prestored table that is stored in memory of an electronic controller of the vehicle airbag system.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
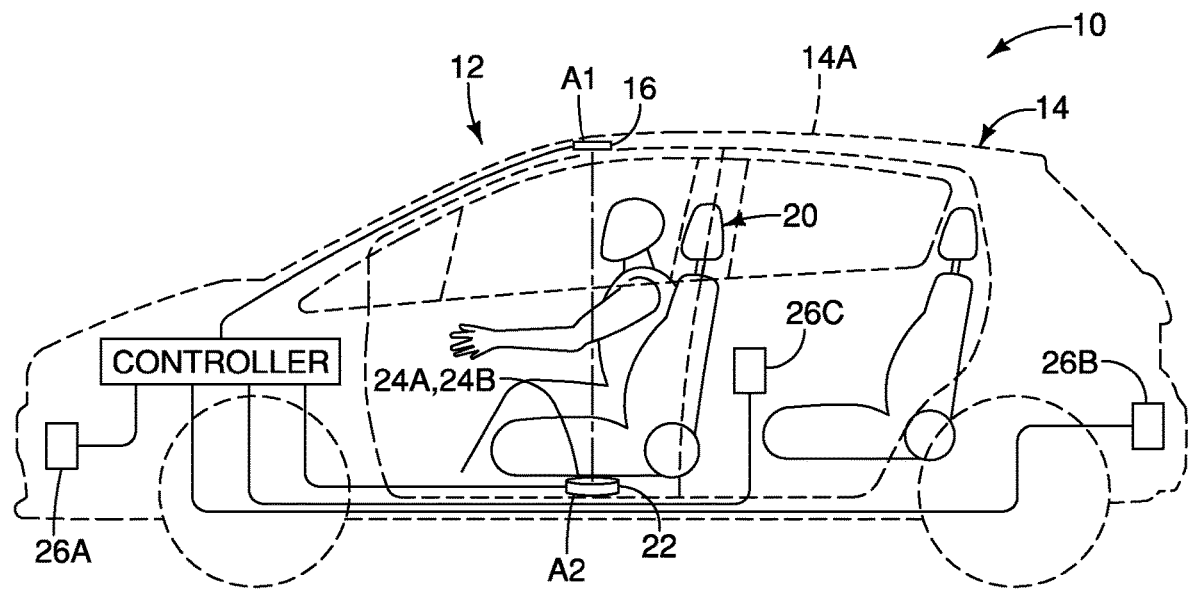
FIG. 1 is a side view of a vehicle having a vehicle airbag system in accordance with an illustrated embodiment.

Referring initially to FIG. 1, a vehicle 10 equipped with a vehicle 10 airbag system 12 is illustrated in accordance with an illustrated embodiment. The vehicle 10 includes a vehicle roof structure 14 and a passenger compartment having a plurality of vehicle seats. The vehicle airbag system 12 includes an airbag module 16 having an inflatable airbag 1 that is configured to be movably mounted to the vehicle roof structure 14. In the illustrated embodiment, the vehicle airbag module 16 is disposed above a front passenger vehicle seat 20. In other words, the vehicle seat 20 disposed below the airbag module 16. Thus, the vehicle 10 airbag system 12 includes at least one vehicle seat. Preferably, the vehicle 10 of the illustrated embodiment can operate in a non-autonomous mode, in a semiautonomous mode (i.e., a partly autonomous mode of operation requiring occasional, human driver intervention) or in a fully autonomous mode (i.e., a fully autonomous mode requiring no human driver intervention).

Thus, the vehicle seat 20 of the vehicle 10 is a rotatable seat that is adjustable by the passenger to face a vehicle forward direction, a vehicle rearward direction, and towards the lateral sides of the vehicle 10. The vehicle seat 20 is movably disposed over a seat base 22. As shown in FIGS. 1, 2, 4 and 5, the vehicle seat 20 is rotatable about the seat base 22 by 360 degrees. The vehicle seat 20 can also slide along a longitudinal length L of the vehicle 10. The seat base 22 is movably mounted to a vehicle floor panel via seat rails (not shown) such that the seat base 22 can slide along the longitudinal length L of the vehicle 10. Thus, the vehicle 10 airbag system 12 further includes the seat base 22.

While the airbag module 16 is illustrated as being arranged with respect to the vehicle seat 20 only, it will be apparent to those skilled in the vehicle field from this disclosure that the arrangement of the vehicle airbag module 16 can be implemented with any one of the vehicle seats. In other words, any of the vehicle seats of the vehicle 10 can also be rotatable and slide along the longitudinal direction L of the vehicle 10 and can be implemented with a vehicle airbag module 16 that is identical to the airbag module 16 of the disclosed embodiment. However, for brevity and simplicity, the vehicle airbag system 12 will be discussed with respect to the vehicle seat 20 only. Further, it will also be apparent to those skilled in the vehicle field that the components of the vehicle airbag system 12 can be implemented with various types of vehicles having different configurations of vehicle seats.

The vehicle 10 airbag system 12 further includes an electronic controller ECU that controls the airbag module 16 to inflate the airbag 18 in a predetermined direction. More specifically, the electronic controller ECU controls the airbag module 16 to inflate the airbag based on a position of the vehicle seat 20, as will be further discussed below. In this disclosure, the vehicle seat 20 position refers to the angular orientation of the vehicle seat 20 (e.g., whether the vehicle seat 20 is facing frontward, rearward, etc.), as well as to the positional location of the vehicle seat 20 inside of the vehicle 10.

The vehicle airbag system 12 further includes a seat detector 24A that detects the position of the vehicle seat 20. Therefore, the seat detector 24A detects an angular position or angular orientation of the vehicle seat 20 with respect to the seat base 22 (hereinafter, the seat angle). In the illustrated embodiment, the seat angle refers to the angular position of the vehicle seat 20 with respect to a direction facing the vehicle front illustrated by the plane P. The seat detector 24A can be a rotational angle sensor mounted on the seat base 22, or any other location that is appropriate. Alternatively, the seat detector 24A can an in-vehicle camera that captures images of changing vehicle seat positions, as well as detect the presence of the passenger and the arrangement of the passenger on the vehicle seat 20. The seat detector 24A can be any other appropriate detector or sensor that is in communication with the electronic controller ECU.

The vehicle airbag system 12 preferably includes a seat detector 24B that detects a longitudinal movement of the vehicle seat 20 along the longitudinal length floor panel. The seat detector 24B can also be mounted to the seat base 22 or directly to the vehicle seat 20, or any other location that is appropriate. The seat detector 24B is also in communication the electronic controller ECU so that the controller ECU controls the airbag module 16 in accordance with a detected position by the seat detector 24B. Therefore, the electronic controller ECU is in communication with the airbag module 16 and the seat detectors 24A and 24B so that the controller ECU controls the airbag module 16 to inflate the airbag 18 in a predetermined direction based on detected position of the vehicle seat 20 by the seat detectors 24A and 24B. More specifically, the controller ECU controls the airbag module 16 to inflate the airbag 1 in one of a default direction D1 and a modified direction D2, as will be further explained below.

As stated, the airbag module 16 is mounted to the vehicle roof structure 14. More specifically, referring to FIGS. 4 to 6, the airbag module 16 is preferably mounted to a vehicle roof panel 14A of the vehicle roof structure 14. The airbag module 16 is disposed between the vehicle roof panel 14A and a roof trim panel (not shown). The roof trim panel can be considered a headliner that is secured to the vehicle roof panel 14A by any suitable type of fasteners in a conventional manner. The roof trim panel forms an interior overhead surface within the passenger compartment of the vehicle 10. The trim panel can include weakened areas, such as perforations, around the airbag module 16 to enable the airbag 1 to easily penetrate the trim panel when the airbag 18 is deployed.

Figure 2:
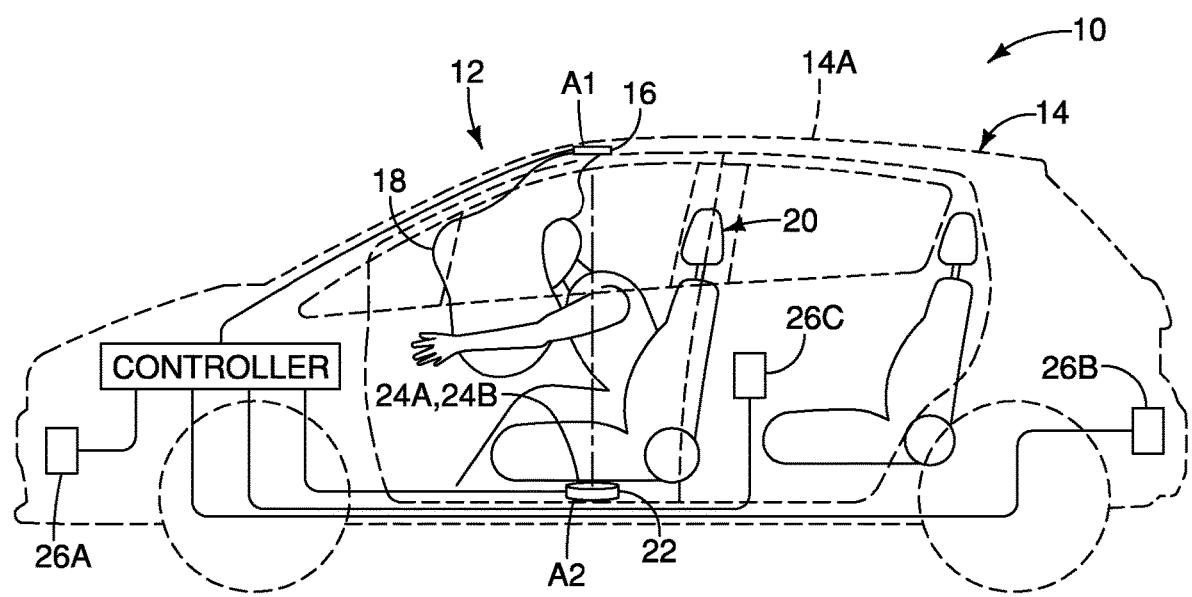
FIG. 2 is a side view of the vehicle of FIG. 1 with an airbag of the airbag system deployed.
Figure 3:
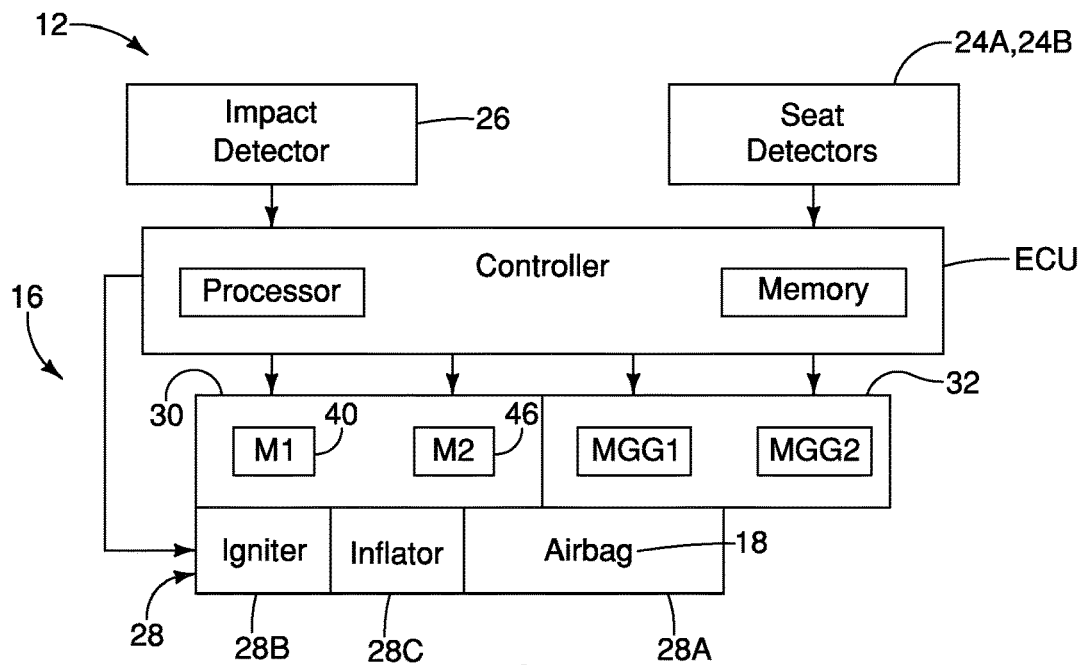
FIG. 3 is a schematic overview of the vehicle airbag system.
Figure 4:
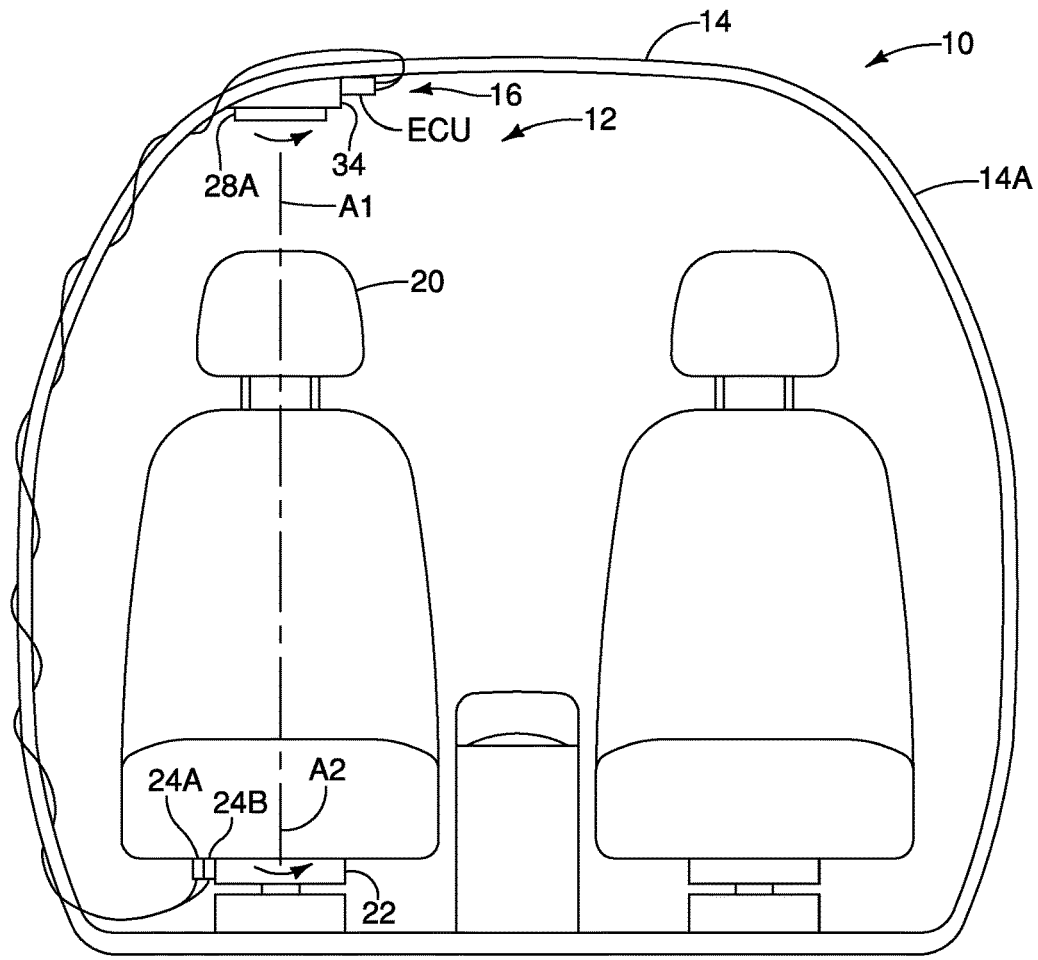
FIG. 4 is a front view of a passenger compartment of the vehicle of FIGS. 1 and 2, showing the airbag system implemented with a front passenger seat.

As seen in FIGS. 1 and 2, the vehicle airbag system 12 further comprises a vehicle impact detector 26 in communication with the controller ECU. The controller ECU controls the airbag module 16 to inflate the airbag 18 upon the impact sensor detecting a predetermined external force to the vehicle 10. Preferably, the vehicle impact detector 26 preferably includes at least front, rear and side impact sensors 26A, 26B, 26C, and/or other impact detectors as appropriate and or necessary related to vehicle airbag deployment. For example, the impact detector 26 can include motion detectors, inertia switches or accelerometers. The impact detector 26 can also include vehicle camera(s) that captures images exterior to the vehicle 10 to detect an oncoming impact to the vehicle 10.

Thus, the airbag 18 is deployed in the predetermined direction based on the information received from the seat detectors 24A and 24B and the impact detector 26. The controller ECU selects the predetermined direction upon the impact detector 26 detecting an external force having a threshold level that necessitates deployment of the airbag 18. The controller ECU is configured to determine (based upon information detected by the impact detector 26) whether or not the impact event is a straight head-on, rear or off-center impact. That is, the airbag 18 deploys in different directions depending on the angle and location of the vehicle seat 20, and the type of external impact to the vehicle 10, as will be further discussed. The controller ECU transmits an ignition signal to the airbag module 16 to deploy the airbag 18. The operation of the controller ECU and the airbag module 16 with respect to the seat position will be further discussed below.

Figure 5:
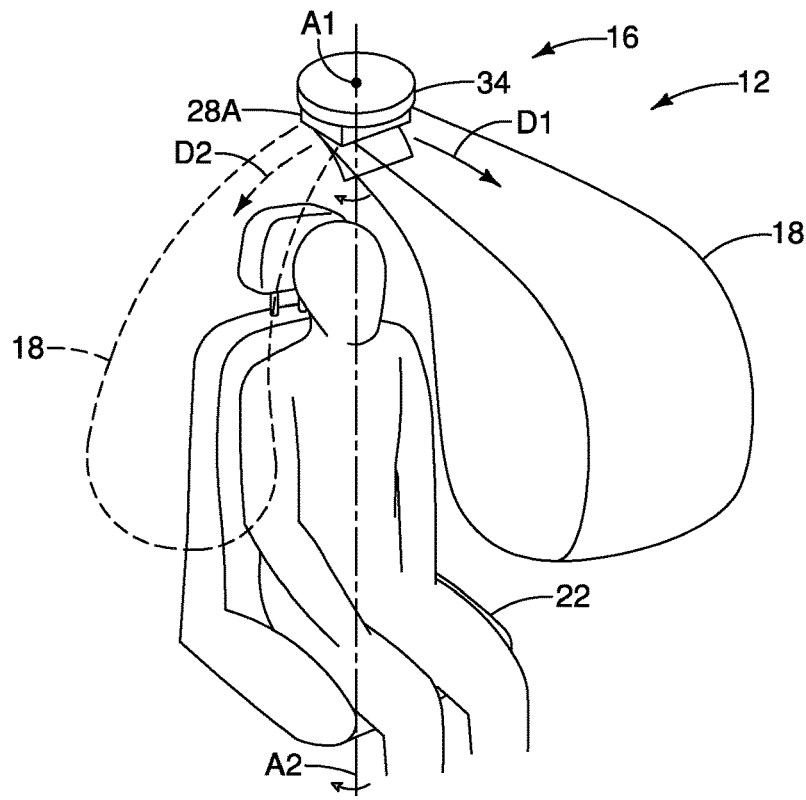
FIG. 5 is a front perspective view of the front passenger seat of FIG. 4 with the airbag deployed in a default position and a modified position.
Figure 6:
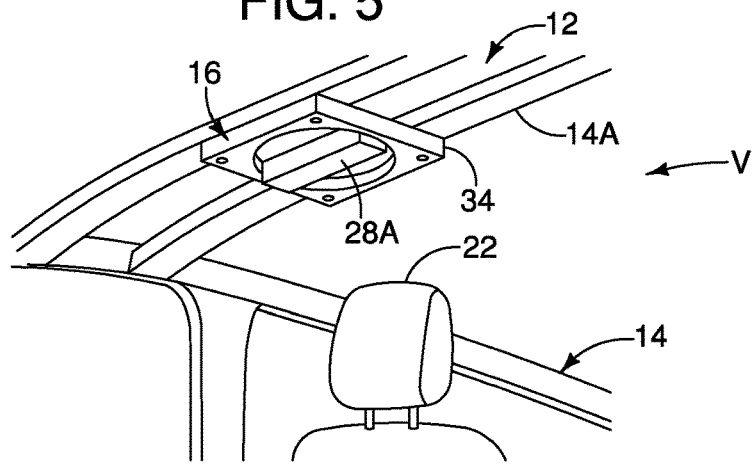
FIG. 6 is a bottom perspective view of a vehicle roof structure of the vehicle having the airbag module of the vehicle airbag system mounted thereon.
Figure 7:
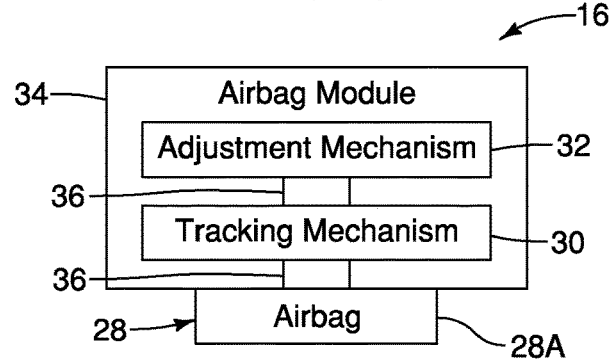
FIG. 7 is a schematic overview of the airbag module of FIG. 6.

The airbag 18 is made of a flexible, fabric bag. As best seen in FIG. 5, the airbag 18 expands into a shape having an arch that is positioned in front of the passenger seat. In the illustrated embodiment, the position of the airbag 18 depicted in FIG. 5 by solid lines is considered a default position of the airbag 18, while the position of the airbag 18 depicted in FIG. 5 by dashed lines is considered a modified position of the airbag 18. Thus, in the illustrated embodiment, the default position of the airbag 18 is any position that results in the airbag 18 being deployed substantially directly in front of the vehicle seat 20 (e.g., directly in front of the vehicle seat 20). In the illustrated embodiment, the modified position of the airbag 18 is any position of the airbag 18 that is offset from directly in front of the vehicle seat 20.

Referring to FIGS. 6 to 9, the airbag module 16 includes a deployment mechanism 28 having an airbag base 28A that houses the airbag 18. The airbag module 16 further includes a tracking mechanism 30 and an adjustment mechanism 32 that are housed in a housing 34 of the airbag module 16. The tracking mechanism 30, the adjustment mechanism 32 and the deployment mechanism 28 are operatively connected via a rotatable shaft 36. In this way, the airbag base 28A is rotatable with respect to the housing 34 of the airbag module 16 about the rotatable shaft 36, as will be explained below. The airbag base 28A is operatively mounted to the housing 34 of the airbag module 16. The deployment tracking, adjustment and mechanisms 28, 30 and 32 are all electrically connected to the controller ECU to receive and send information to and from the controller ECU. The components of the deployment tracking, adjustment and mechanisms 28, 30 and 32 are all interconnected by a wiring harness (not shown) and powered by the vehicle's 10 battery in a conventional manner.

The deployment mechanism 28 deploys the airbag 18 from the airbag base 28A when the Vehicle 10 receives an external impact having the threshold level. The deployment mechanism 28 includes an ignitor 28B and an inflator 28C. The ignitor 28B receives the ignition signal from the controller ECU and activates the inflator 28C, which is coupled to the airbag 18 to inflate pressurized gas into the airbag 18. The deployment mechanism 28 having the ignitor 28B and the inflator 28C can be considered a generator that deploys the airbag 18. Therefore, the electronic controller ECU activates the generator to the deploy the airbag 18 upon the impact sensor detecting the predetermined external force to the vehicle 10. For example, the controller ECU sends the ignition signal to activate the inflator 28C upon the impact detect or 26 detecting the external force to inflate the airbag 18.

Figure 8:
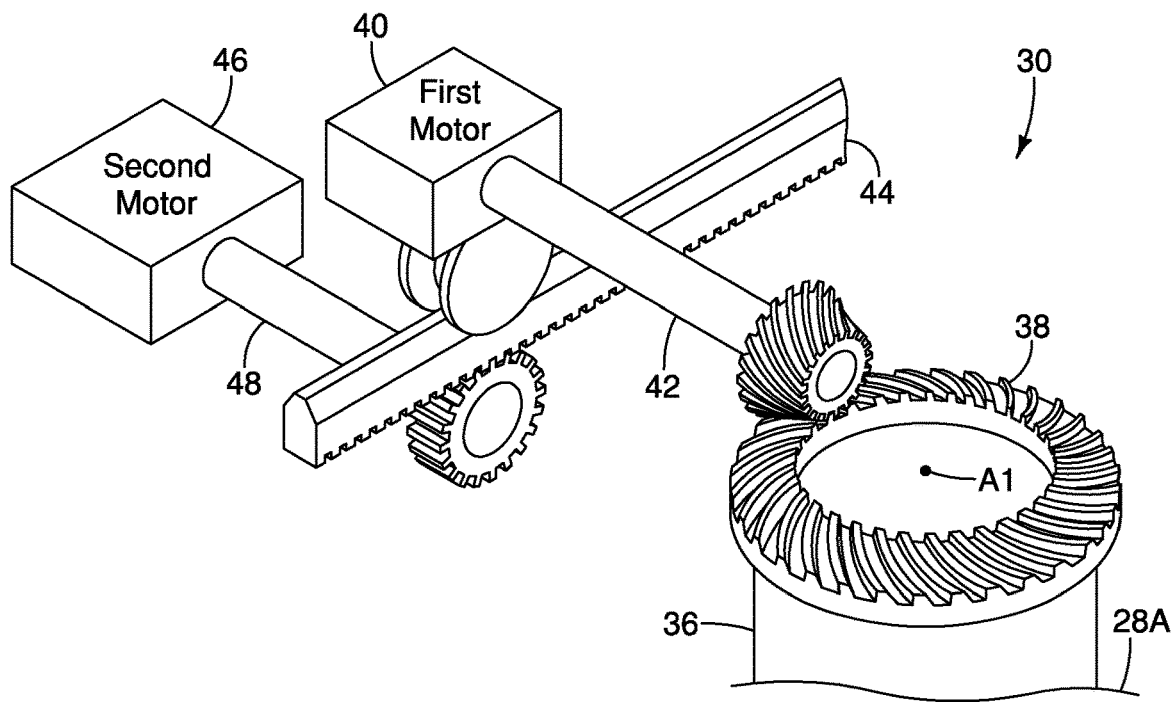
FIG. 8 is a side perspective view of a tracking mechanism of the airbag module.

Referring to FIG. 8, the tracking mechanism 30 is configured to continuously track the position of the vehicle seat 20 when the vehicle 10 is turned ON during use. In particular, the tracking mechanism 30 continuously changes a deployment position of the airbag 18 based on continuous monitoring of the position of the vehicle seat 20. The tracking mechanism 30 includes an actuator 38 and a first motor 40 that is operatively connected to the actuator 38 by an output shaft 42 to power the actuator 38. In particular, the airbag base 28A is operatively connected to the airbag actuator 38 via the rotatable shaft 36 such that actuating the actuator 38 turns the airbag base 28A. The actuator 38 is considered an airbag actuator 38 that is powered by the first motor 40 to move the airbag base 28A in response to a movement of the vehicle seat 20. Thus, the airbag module 16 further includes the airbag actuator 38 that actuates the airbag base 28A to one of the default position and the modified position. As shown, the actuator 38 is a movable plate or a gear that is driven by the output shaft 42. The airbag actuator 38 actuates the airbag base 28A to a selected position that is selected by the controller ECU. In particular, the airbag actuator 38 rotates the airbag base 28A about a center rotational axis A1 that is parallel to a center rotational axis A2 of the vehicle seat 20.

The first motor 40 powers the airbag actuator 38 to move the airbag base 28A to the position selected by the controller ECU. The first motor 40 is preferably, for example, a direct-current motor. The first motor 40 is a reversible motor that is configured to operate in two directions. In the illustrated embodiment, upon determining that the vehicle seat 20 has rotated about the seat base 22, the electronic controller ECU sends an electrical signal to the first motor 40 to operate the first motor 40 in a desired direction to drive the actuator 38 to rotate in a desired direction in accordance with the seat angle about the seat base 22. Thus, in the illustrated embodiment, the tracking mechanism 30 continuously tracks the position of the vehicle seat 20 so that the airbag module 16 adjusts the position of the airbag 18 deployment in accordance with the seat position.

Figure 11:
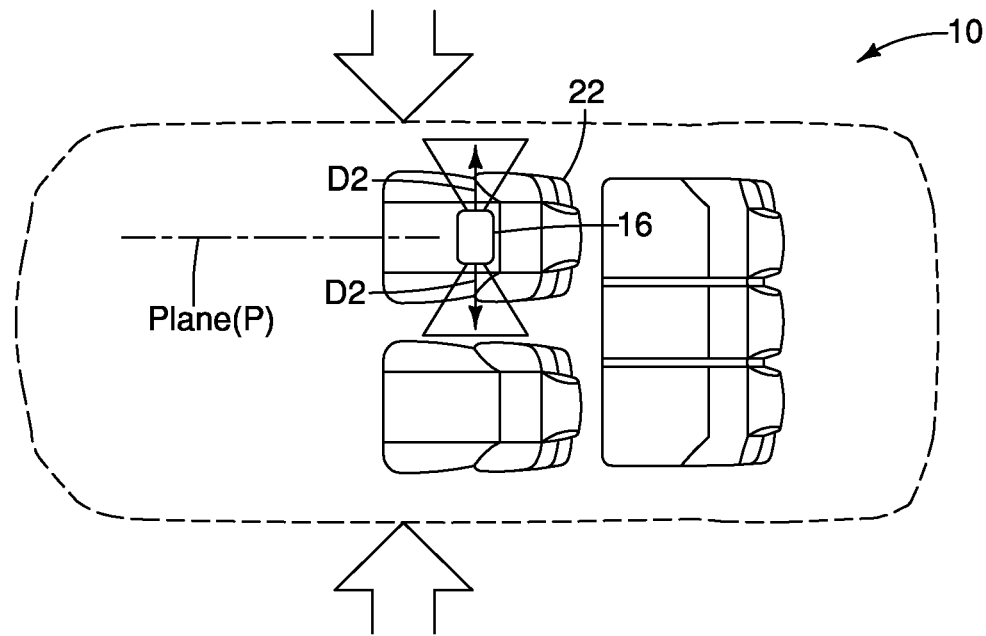
FIG. 11 is a top plan view of the vehicle with the front passenger vehicle seat facing a vehicle forward direction.
Figure 12:
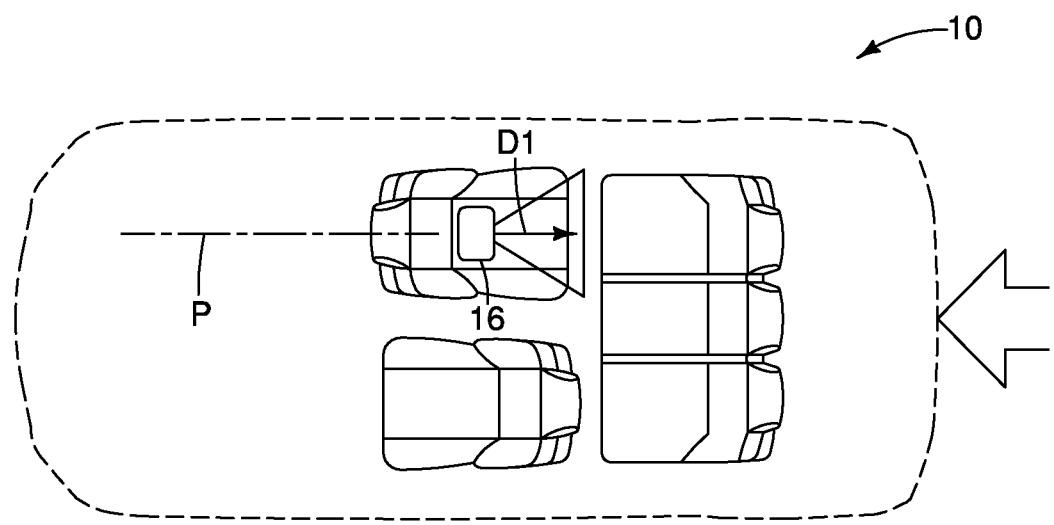
FIG. 12 is a top plan view of the vehicle with the front passenger vehicle seat facing a rearward forward direction.

The tracking mechanism 30 further includes a module base 44 and a second motor 46 that powers the module base 44. As best seen in FIG. 11, the module base 44 is an elongated rail that is operatively connected to the actuator 38. The module base 44 is illustrated as being disposed inside of the housing 34 of the airbag module 16. Alternatively, the module base 44 can be mounted to the vehicle roof structure 14 with the housing 34 of the airbag module 16 mounted thereon. The module base 44 is powered by the second motor 46 that is also preferably a reversible direct-current motor that is electronically controlled by the controller ECU. As shown, the first motor 40 is mounted to the module base 44 such that the actuator 38 can travel along the length of the module base 44. The actuator 38 is movably mounted to the module base 44 via the first motor 40. Thus, the airbag base 28 is movably mounted onto the module base 44 to move the airbag base 28A in accordance with the detected seat position by the seat detector 24A.

The tracking mechanism 30 further includes an output shaft 42 that operatively connects the second motor 46 to the module base 44 to actuate the module base 44. The tracking mechanism 30 tracks a movement of the vehicle seat 20 along the longitudinal direction L of the vehicle 10 (e.g., if the passenger slides the vehicle seat 20 forward or rearward, or reclines the vehicle seat 20). That is, upon detecting a change in the longitudinal movement of the vehicle seat 20, the electronic controller ECU sends an electrical signal to the second motor 46 to operate the second motor 46 in an appropriate direction to drive the module base 44. The first motor 40 is mounted to the module base 44 so that the first motor 40 and the actuator 38 travels along the length of the module base 44 when the seat moves in the longitudinal direction L. Thus, the location of the airbag base 28A can be adjusted based on a longitudinal movement of the vehicle seat 20. In this way, the electronic controller ECU controls the second motor 46 in response to the seat detector 24A detecting a change in a longitudinal position of the vehicle seat 20.

In the illustrated embodiment, the tracking mechanism 30 tracks the position of the vehicle seat 20 to deploy the airbag 18 into the default position. In other words, the tracking mechanism 30 tracks the vehicle seat 20 position such that the airbag 18 is deployed in front of the vehicle seat 20. However, in certain situations, the controller ECU determines that the airbag 18 is preferably deployed in the modified direction D2 that is not in front of the vehicle seat 20. For example, as seen in FIG. 11, when the vehicle seat 20 receives a righthand side impact or a lefthand side impact while facing forward, the airbag 18 preferably deploys at the modified position in these situations. That is, when the vehicle seat 20 is facing forward and the vehicle 10 receives an impact on the righthand side, the airbag 18 deploys in the modified direction D2 towards the righthand side of the vehicle 10 to counteract the force coming from the righthand side. In the illustrated embodiment, the deployment positions of the airbag 18 illustrated in FIG. 11 are modified positions. In the instance that the controller ECU determines that a modified position is necessary, the controller ECU activates the adjustment mechanism 32 so that the airbag 18 is not deployed in front of the vehicle seat 20.

Figure 9:
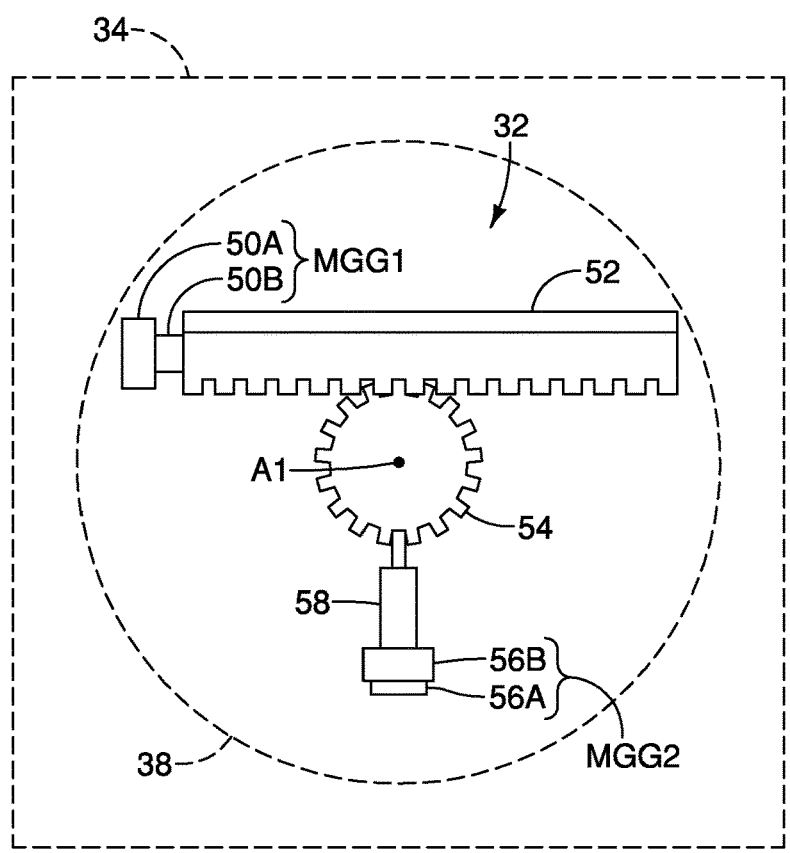
FIG. 9 is a top plan view of an adjustment mechanism of the airbag module.

Referring to FIG. 9, the adjustment mechanism 32 is disposed inside of the housing 34 of the airbag module 16. The adjustment mechanism 32 includes a first generator MGG1, a driving piston 52, a driven gear 54 and a stopper piston 58. The adjustment mechanism 32 further includes a second generator MGG2 and a stopper piston 58. As shown, the driven gear 54 is operatively connected to the actuator 38 of the tracking mechanism 30 by the rotatable shaft 36, which is connected to the airbag base 28A. The airbag base 28A is rotatable about the shaft 36 to move in response to actuation by the tracking mechanism 30 and the adjustment mechanism 32. The adjustment mechanism 32 is illustrated as being disposed inside of the housing 34 of the airbag module 16. However, it will be apparent to those skilled in the vehicle 10 field from this disclosure that the adjustment mechanism 32 and the tracking mechanism 30 can be disposed in separate housings as desired and/or necessary.

The first generator MGG1 is a gas generator that generates inert gas. The first generator MGG1 includes an initiator 50A that generates an initiator charge and a gas generant housing 34 that houses gas generating composition (e.g., powder). The gas generating composition ignites and burns in response to ignition of the initiator 50A to produce gases for actuating the driving piston 52. The driving piston 52 includes teeth that are operatively engaged with the driven gear 54 to drive the driven gear 54 in response to ignition of the initiator 50A. The first generator MGG1 can be, for example, a micro gas generator. That is, the initiator 50A, the gas generant housing 34 and the gas generating composition are components of a micro gas generator that can be implemented with the first generator MGG1.

The second generator MGG2 is similar to the first generator MGG1. That is, the second generator MGG2 can be a micro gas generator having an initiator 56A that ignites a gas generating composition from a gas generant housing 56B. The second generator MGG2 drives the stopper piston 58 into engagement with the driven gear 54 to stop rotation of the airbag base 28A. In this way, the second generator MGG2 stops the rotation of the driven gear 54 by igniting the initiator to drive the stopper piston 58 to stop the driven gear 54 at a prescribed point. By stopping rotation of the driven gear 54, rotation of the airbag base 28A is stopped at the modified position to deploy the airbag 18 at the modified position. Thus, in the illustrated embodiment, the components of the adjustment mechanism 32 can collectively be considered a limiter that limits the rotation of the airbag base 28A to adjust the airbag deployment. In other words, the airbag module 16 includes the limiter that is activated by the electronic controller ECU so that the airbag 18 is deployed into the modified position. As stated, the tracking mechanism 30 tracks the seat position such that the airbag 18 will always deploy in front of the vehicle seat 20. When the controller ECU determines that the modified position is necessary, the adjustment mechanism 32 adjusts the position set by the tracking mechanism 30. Therefore, the controller ECU activates the first and second generators MGG1 and MGG2 of the adjustment mechanism 32 to further actuate the airbag 1 into the modified position.

The electronic controller ECU is preferably a microcomputer that includes one or more processors and one or more computer storage devices (i.e., computer memory devices). The electronic controller ECU is formed of one or more semiconductor chips that are mounted on a printed circuit board. The term "electronic controller ECU" as used herein refers to hardware that executes a software program, and does not include a human. The electronic controller ECU preferably includes a microcomputer with an airbag deployment control program that controls the deployment of the airbag 18. The controller ECU can also include other conventional components such as an input interface circuit, an output interface circuit, and storage devices such as a ROM (Read Only Memory) device and a RAM (Random Access Memory) device.

The microcomputer of the controller ECU is programmed to control the airbag 18. The memory circuit stores processing results and control programs such as ones for airbag operation that are run by the processor circuit. The controller ECU is operatively coupled to the components of the airbag module 16 and the seat detectors 24A and 24B in a conventional manner. The internal RAM (e.g., memory) of the controller ECU stores statuses of operational flags and various control data. It will be apparent to those skilled in the art from this disclosure that the precise structure and algorithms for the controller ECU can be any combination of hardware and software that will carry out the functions of the present invention. The internal RAM of the controller ECU can include one or more prestored tables of predetermined directions for deploying the airbag 18, such as the prestored table illustrated in FIG. 10.

Figure 13:
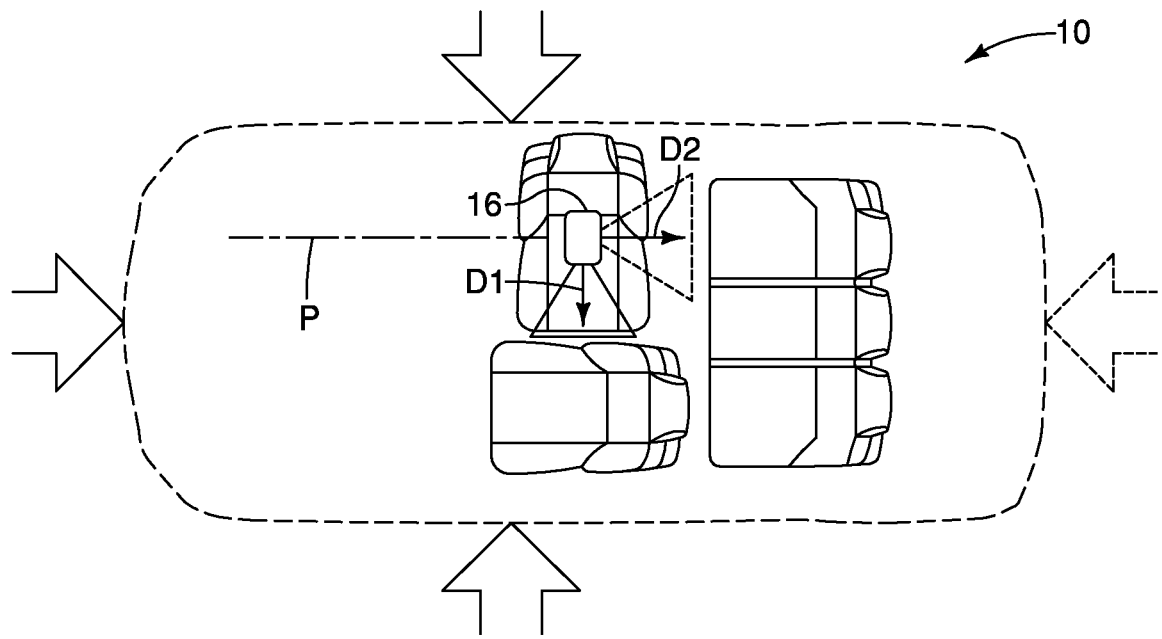
FIG. 13 is a top plan view of the vehicle with the front passenger vehicle seat facing a vehicle left hand side.
Figure 14:
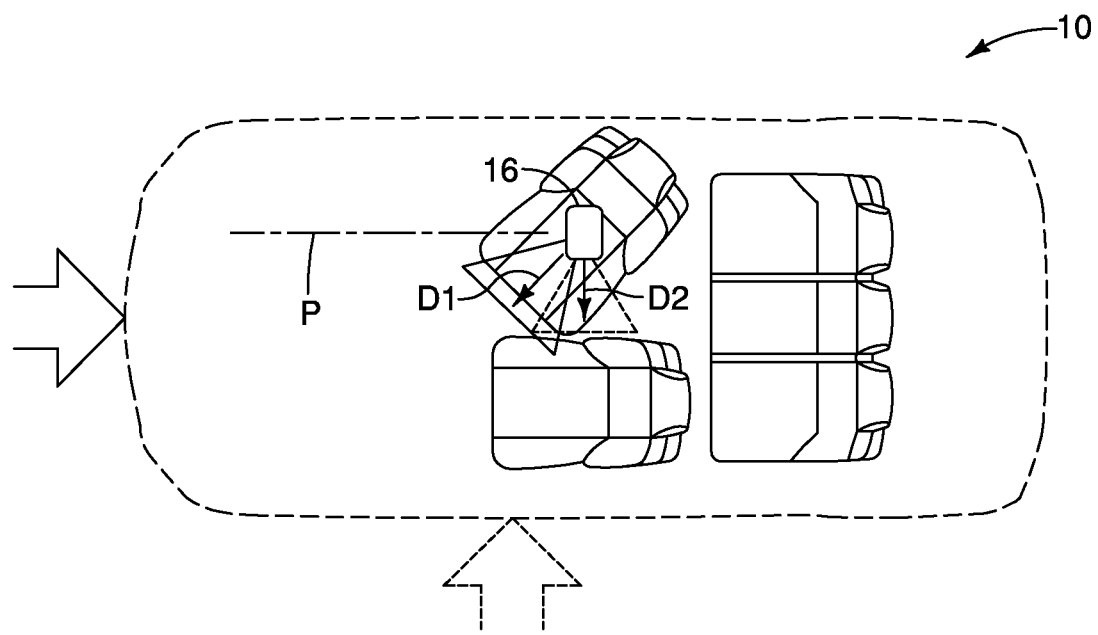
FIG. 14 is a top plan view of the vehicle with the front passenger vehicle seat facing at an angle between the vehicle forward direction and the vehicle left hand side.

The controller ECU selects a predetermined direction from among the prestored predetermined directions based on detected seat position by the seat detectors 24A and 24B. The seat angles of the prestored table (0 degrees, 180 degrees, 270 degrees and 315 degrees) are reflected by the vehicle seat 20 of FIGS. 11 to 14, respectively. Referring to FIG. 13 as an example, if the vehicle seat 20 is positioned at an angle that is 270 degrees with respect to the plane P and the vehicle 10 experiences a left hand side impact (side LH impact), the controller ECU controls the airbag module 16 to deploy the directly in front of the vehicle seat 20 (i.e., 270 degrees with respect to the plane P), which, is the default position of the airbag 18. However, if the vehicle 10 with the vehicle seat 20 of FIG. 13 experiences a rear impact, the controller ECU controls the airbag module 16 via the adjustment mechanism 32 to deploy the airbag 18 at an angle that is 180 degrees with respect to the plane P.

In FIG. 10, the deployment directions are illustrated as angles with respect to the plane P. The deployment angles without asterisks (*) result in the airbag 18 being deployed in the default position. The deployment angles with asterisks (*) result in the airbag 18 being deployed in the modified position. The disclosed seat angles and impact locations are examples that can be implemented into the airbag module 16. It will be apparent to those skilled in the vehicle field from this disclosure that the memory can include additional seat angles and impact locations as needed and/or necessary.

Figure 15:
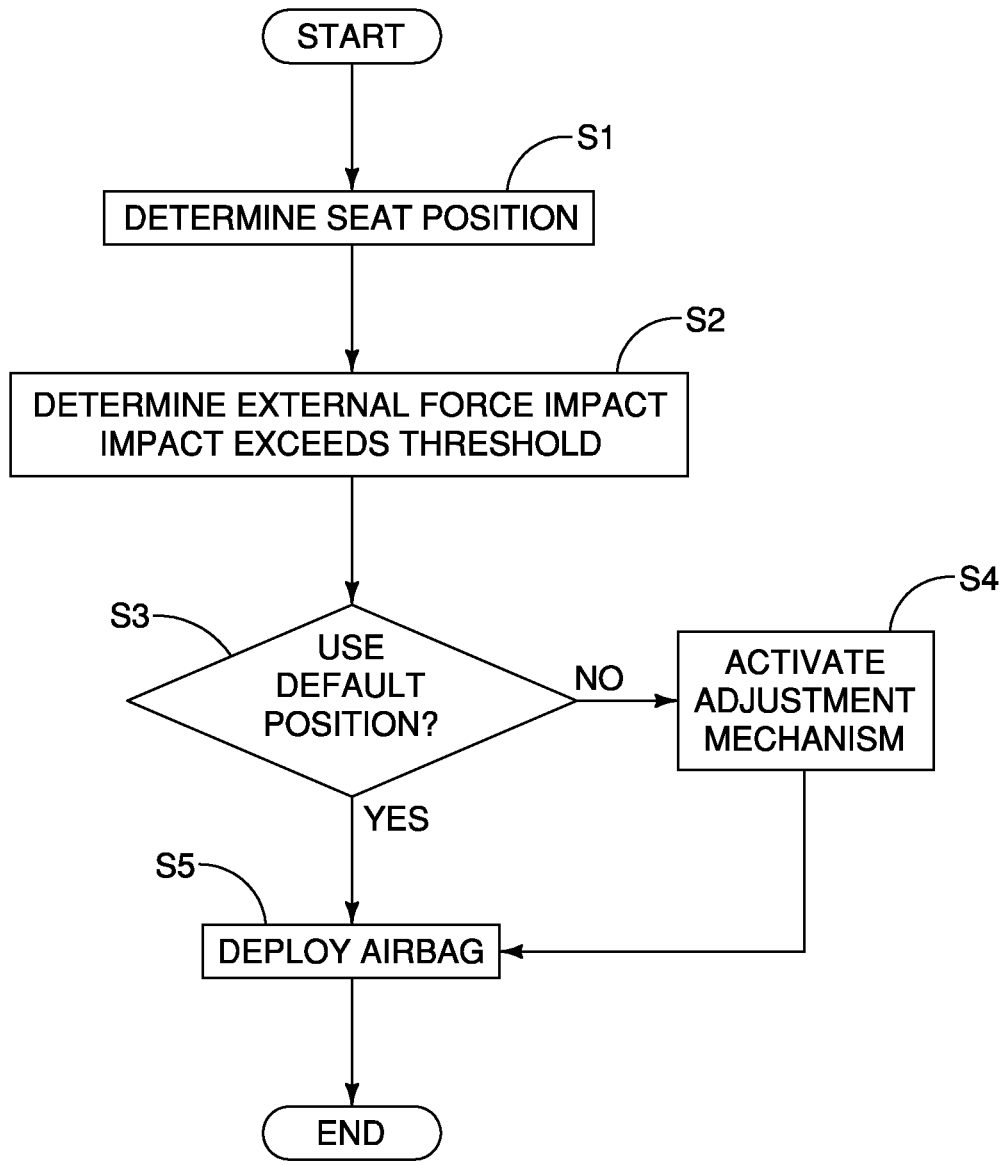
FIG. 15 is a decision-making flowchart of the electronic controller of the vehicle airbag system.

Referring to FIG. 15, an example of the controller ECU's decision-making algorithm is illustrated. In step s1, the controller ECU continuously monitors the vehicle seat 20 position (e.g., the seat angle and the longitudinal position of the vehicle seat 20 in the vehicle 10). The controller ECU determines the seat position as the tracking mechanism 30 of the airbag module 16 continuously tracks the position of the vehicle seat 20. In step s2, the controller ECU determines that an external force impact exceeds a predetermined threshold based on information detected by the impact detector 26. In step s3, the controller ECU determines whether the default position of the airbag 18 is appropriate, based on information received by the seat detector 24A and the location of the impact detected by the impact detector 26. If no, the controller ECU activates the adjustment mechanism 32 in step s4 and immediately thereafter controls the deployment mechanism 28 to deploy the airbag 18 in step s5. If the controller ECU determines that the default position is appropriate, the controller ECU directly goes to step s5 and controls the deployment mechanism 28 to deploy the airbag 18 into the default position.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal" "below" and "transverse" as well as any other similar directional terms refer to those directions of a vehicle equipped with the vehicle airbag system. Accordingly, these terms, as utilized to describe the present invention should be interpreted relative to a vehicle equipped with the vehicle airbag system.

The tem "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially" "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided tar illustration only, and not for the purpose of limiting the invention as defined by the appended claims and their equivalents.

What is claimed is:

1. A vehicle airbag system comprising:
    an airbag module having an airbag that is configured to be movably mounted to a vehicle roof structure of a vehicle;
    a seat detector that detects a position of a vehicle seat;
    a vehicle impact detector that detects a direction of an external impact with respect to the vehicle; and
    an electronic controller in communication with the vehicle impact detector, the airbag module and the seat detector, the controller controlling the airbag module to inflate the airbag in a predetermined direction into one of a default position and a modified position based on a detected position of the vehicle seat by the seat detector and the direction of external impact that is detected by the impact detector, the default position being a position that is substantially directly in front of the vehicle seat when the airbag is deployed, the modified position being a position that is offset from the default position when the airbag is deployed such that the electronic controller controls the airbag module to deploy at different angles depending on the direction of external impact that is detected by the impact detector.

2. The vehicle airbag system according to claim 1, wherein
    the airbag module further comprises an airbag base that stores the airbag in an undeployed state, the airbag module further includes an airbag actuator that actuates the airbag base to a selected position selected by the controller.

3. The vehicle airbag system according to claim 2, wherein
    the airbag module further includes a motor that powers the airbag actuator to move the airbag base to the selected position.

4. The vehicle airbag system according to claim 3, further comprising
    the controller controlling the airbag module to inflate the airbag upon the impact detector detecting a predetermined external force to the vehicle.

5. The vehicle airbag system according to claim 1, wherein
    the airbag module includes an ignitor and a limiter, the electronic controller activating the ignitor to the deploy the airbag upon the impact detector detecting the predetermined external force to the vehicle, the electronic controller activating the limiter so that the airbag is deployed into the modified position.

6. The vehicle airbag system according to claim 2, wherein
    the airbag actuator rotates the airbag base about a center rotational axis that is parallel to a center rotational axis of the vehicle seat.

7. The vehicle airbag system according to claim 1, wherein
    the seat detector detects an angular position of the vehicle seat with respect to a seat base.

8. The vehicle airbag system according to claim 1, wherein
    the electronic controller includes memory having at least one prestored table of predetermined directions for deploying the airbag, the controller selecting a predetermined direction from among the prestored predetermined directions based on detected seat position by the seat detector.

9. A vehicle having a vehicle airbag system, comprising:
    an airbag module having an airbag movably mounted to a vehicle roof structure of a vehicle;
    a vehicle seat disposed below the airbag module;
    a seat detector that detects a position of the vehicle seat;
    a vehicle impact detector that detects a direction of an external impact with respect to the vehicle; and
    an electronic controller in communication with the vehicle impact detector, the airbag module and the seat detector, the controller controlling the airbag module to inflate the airbag in a predetermined direction into one of a default position and a modified position based on a detected position of the vehicle seat by the seat detector and the direction of external impact that is detected by the impact detector, the default position being a position that is substantially directly in front of the vehicle seat when the airbag is deployed, the modified position being a position that is offset from the default position when the airbag is deployed such that the electronic controller controls the airbag module to deploy at different angles depending on the direction of external impact that is detected by the impact detector.

10. The vehicle according to claim 9, wherein the seat detector detects an angular position of the vehicle seat with respect to a seat base that supports the vehicle seat.

11. The vehicle according to claim 9, wherein the airbag module further comprises an airbag base that stores the airbag in an undeployed state, the airbag module further includes an airbag actuator that actuates the airbag base to a selected position selected by the controller.

12. The vehicle according to claim 9, further comprising the controller controlling the airbag module to inflate the airbag upon the impact detector detecting a predetermined external force to the vehicle.

13. The vehicle airbag system according to claim 12, wherein the airbag actuator rotates the airbag base about a center rotational axis that is parallel to a center rotational axis of the vehicle seat.

14. The vehicle airbag system according to claim 13, wherein the airbag module further includes a module base in communication with the electronic controller, the airbag base being movably mounted onto the module base to move the airbag base based on a detected longitudinal position of the vehicle seat by the seat detector.

15. The vehicle airbag system according to claim 14, wherein the airbag module further includes a first motor that powers the airbag actuator and a second motor that powers the module base, the electronic controller controlling the first and second motors based on detected seat position.

16. A vehicle having a vehicle airbag system, comprising:
an airbag module having an airbag movably mounted to a vehicle roof structure of a vehicle;
a vehicle seat disposed below the airbag module;
a vehicle impact detector that detects a direction of an external impact with respect to the vehicle; and
an electronic controller controlling the airbag module to inflate the airbag in one of a default direction and a modified direction based on a detected position of the vehicle seat by the seat detector and the direction of external impact that is detected by the impact detector, the default position being a position that is substantially directly in front of the vehicle seat when the airbag is deployed, the modified position being a position that is offset from the default position when the airbag is deployed, the airbag being deployed into a default position that is substantially directly in front of the vehicle seat when deployed in the default direction, the airbag being deployed into a modified position that is offset from the default position when deployed in the modified direction such that the electronic controller controls the airbag module to deploy at different angles depending on the direction of external impact that is detected by the impact detector.

17. The vehicle airbag system according to claim 16, wherein the airbag module further comprises an airbag base that stores the airbag in an undeployed state, the airbag module further includes an airbag actuator that actuates the airbag base to one of the default position and the modified position.

18. The vehicle airbag system according to claim 17, wherein the actuator includes an ignitor and a limiter, the electronic controller activating the ignitor to the deploy the airbag upon the impact detector detecting the predetermined external force to the vehicle, the electronic controller activating the limiter so that the airbag is deployed into the modified position.

19. The vehicle according to claim 11, wherein the electronic controller includes memory having a prestored table of predetermined directions for deploying the airbag into one of the default position and the modified position, the controller selecting a predetermined direction from among the prestored predetermined directions based on detected seat position by the seat sensor.

* * * * *